July 12, 1966     E. C. MATTSON     3,260,133
CONTROLLED DIFFERENTIAL ADJUSTABLE SPEED REVERSING DRIVE SYSTEM
Filed April 13, 1964
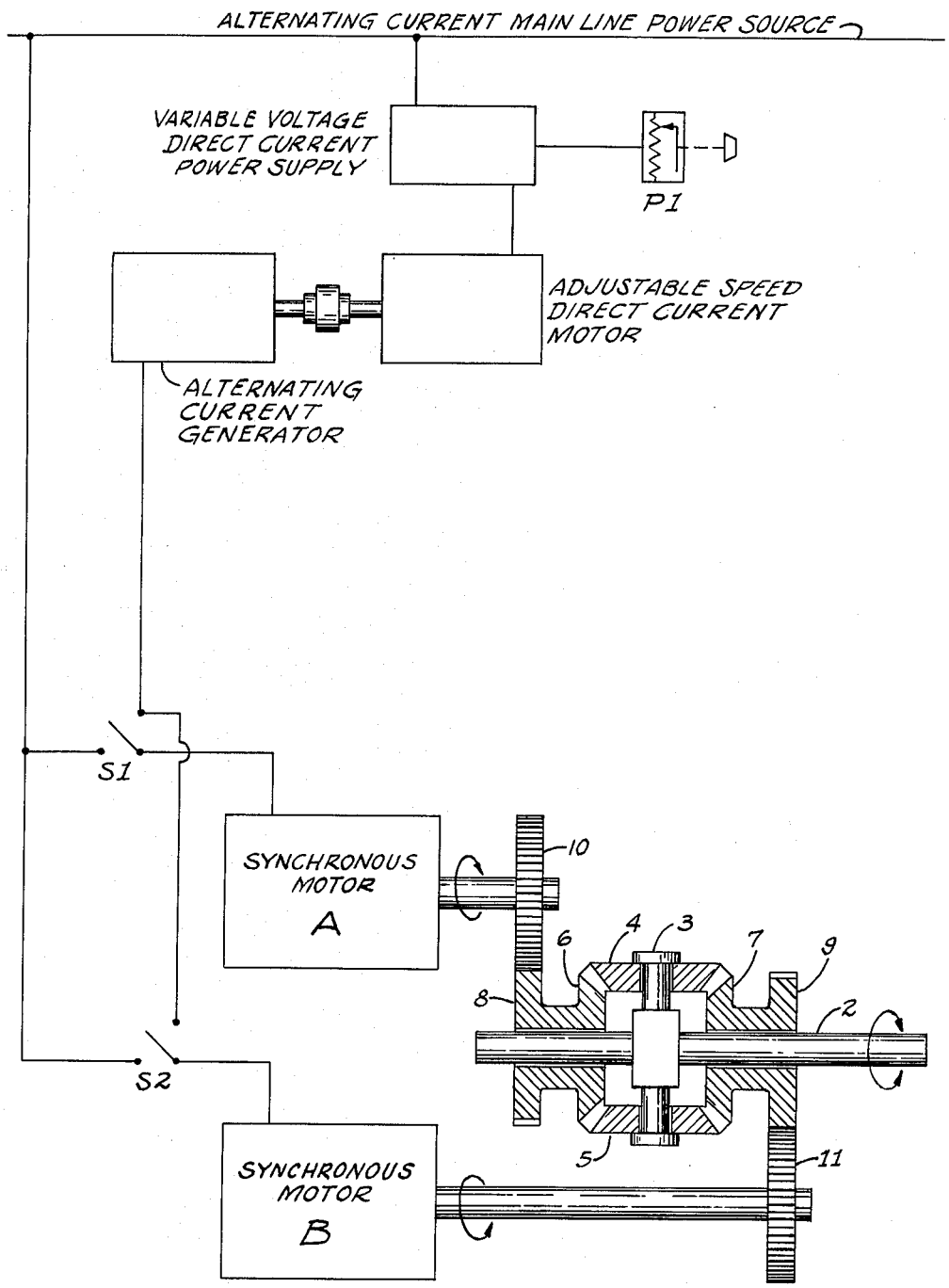
INVENTOR
*Evert C. Mattson*

United States Patent Office 3,260,133
Patented July 12, 1966

3,260,133
CONTROLLED DIFFERENTIAL ADJUSTABLE SPEED REVERSING DRIVE SYSTEM
Evert C. Mattson, 135 Western Ave. N.,
St. Paul, Minn. 55102
Filed April 13, 1964, Ser. No. 359,012
1 Claim. (Cl. 74—675)

My present invention relates to electrically powered and controlled adjustable speed drive systems of the motor driven mechanical differential gear type.

It is among the principal objects of this invention to provide a simple, yet highly efficient and reliable adjustable speed drive system with rotating output shaft controlled to provide infinitely variable speed and positive full power output throughout an infinite reversing speed range, with positive and accurate load power control at all speeds including zero.

More specifically, it is among the objects of this invention to provide an electrical adjustable speed reversing drive system wherein the system output drive shaft may be continuously varied in angular velocity of rotation or accurately set at any given single speed within the system output speed range from zero to maximum design limits in both directions of rotation, and whereby the output shaft will also deliver a constant torque power value at all speeds including infinitesimal speeds approaching zero.

It is also among the objects of this invention to provide an adjustable speed reversing drive system, as described, wherein, the output shaft may be accurately controlled at all given speeds including zero, with the output shaft being positively locked in a stationary position at zero speed. In the present system the output shaft may be gradually adjusted to zero speed or instantly switched from full speed to zero without the use of secondary mechanical load braking apparatus. In all cases the output shaft will be positively locked at zero speed and will remain so under full load conditions until adjusted off zero setting.

A further object of the invention is to provide an adjustable speed drive system, as described wherein the output shaft may be gradually and smoothly reversed in direction of rotation or instantly reversed by means of switching from one direction of rotation to the opposite direction. In the present system reversing action will take place without changing the set rotation of the system drive motor, and without interruption of input or output power, thereby eliminating complicated electronic reversing apparatus and heavy electrical overload conditions due to the fast reversing action.

A further object of the invention is to provide an adjustable speed reversing drive system, as described, with synchronous output speeds, whereby the speed of the system output shaft will operate at alternating current synchronous speeds in direct relation to the frequency of electric alternating current power input. The system output shaft will then be locked in absolute synchronism with input power alternating current frequencies at all speeds including zero and in both directions of rotation.

A further object of the invention is to provide an adjustable speed reversing drive system, as described, whereby performance of the system output shaft will be identically the same in either direction of rotation under positive or negative (over-running) load conditions, such as a hoist load being raised or lowered under the influence of gravity.

Still a further object of the invention is to provide an adjustable speed drive system, as described, of simplified construction, wherein the necessary drive motors and gearing may be packaged in a neat and compact power transmission unit at a reasonable cost.

The present invention will then provide critically accurate control of a driven load at all speeds including zero, throughout an infinite reversing speed range. It will also be recognized that the present drive system may be easily adapted to perform automatic and programmed precision machine operations, as well as manual controlled operation from a remote location.

These and further objects and features of this invention will become apparent and more clearly understood from the following specifications when considered in connection with the accompanying drawing. Wherein I have illustrated preferred embodiments of the invention. It is to be understood, however, that the drawing is to be considered as illustrative only, rather than in a limiting sense, the important and unique features of the invention being pointed out more specifically in the appended claim.

In the drawing there is shown a single figure which is a simplified diagrammatic layout view of the electrical and mechanical components constituting the present invention, wherein I provide two alternating current synchronous motors, A and B, driving and controlling a single bevel gear differential unit, with said differential unit including the system output shaft 2 with spider member 3 as a solid integral part thereof; bevel pinion gears 4 and 5, bevel side gears 6 and 7, and end input gears 8 and 9, with end input gear 8 being a solid integral part of bevel side gear 6 and the end input gear 9 being a solid integral part of bevel side gear 7. As shown bevel pinion gears 4 and 5 are rotatably mounted and free running on spider member 3, and in mesh with bevel side gears 6 and 7 which are rotatably mounted and free running on the system output shaft 2 along with end input gears 8 and 9. The foregoing differential elements 2 through 9 then constitute a bevel gear differential unit with a constant displacement ratio of 2:1 between end input gears 8 and 9 and the system output shaft 2 or stated another way the internal ratio of the differential unit is 2.

The differential unit and system output shaft will receive rotary input power from the two synchronous motors by means of drive pinion gear 10 affixed to motor shaft A and in mesh with end input gear 8, and drive pinion gear 11 affixed to motor shaft B and in mesh with end input gear 9. The drive ratio of gears 8 and 10, and 9 and 11 may be taken as 1:1 for the present description.

As shown in the electrical diagram of the drawing the two synchronous motors will be powered and controlled from an alternating current variable frequency power supply unit and also from an alternating current main line power source at a constant fixed frequency output. As indicated by the directional arrows in the drawing the two synchronous motors will be powered to rotate in opposite directions at all times during operation of the system output shaft, therefore input power to the differential unit at end input gears 8 and 9 will also be in opposite directions.

In the electrical wiring of the system there is provided two electrical selector switches, S1 and S2, located as shown, controlling input power to the synchronous motors from the two separate power sources, with selector switch S1 being connected at input power lines of synchronous motor A and selector switch S2 being connected at input power lines of synchronous motor B.

The variable frequency power supply unit will be in the form of a variably driven alternating current generator, sometimes referred to as an alternator. This power supply unit will consist of a rotating alternator variably driven by an adjustable speed direct current shunt wound motor which in turn will be powered and controlled from a variable voltage direct current power supply unit of solid state electronic construction. The variable voltage power supply is also provided with a voltage adjustment potentiometer, designated P1. The potentiometer is then the operational control device for speed performance of the system output shaft.

It is well known that the direct current shunt wound motor is inherently an adjustable speed motor and only minimum consideration is necessary to take advantage of this feature. When properly controlled this motor will provide variable speed constant torque output over a limited speed range. The basic control concept of this motor is relatively simple. The speed of a direct current shunt motor, while its field excitation remains constant, is essentially proportional to the voltage applied to the motor armature. If the voltage applied to the motor armature is varied the resultant speed of the motor in turn will be varied or adjusted. There are many excellent solid state electronic adjustable voltage power supply units now available, at moderate costs, to provide precise variable speed control of the direct current shunt motor. The rotating alternator is also a well documented unit, recent developments in this type of electrical apparatus provides some excellent power units for use as a source of alternating current power at variable frequencies when variably driven over a limited speed range. The variable frequency power supply system, as described, can be replaced with any type of electrical power apparatus providing controlled alternating current variable frequency output. Static electronic adjustable frequency supply systems used to vary alternating current motor input are gaining some favor in applications involving variable speed synchronous motors. However, for the present invention a far less expensive system involves the use of an alternator whose speed is changed to produce the varying frequency output required. This is especially true since the present system does not require variable frequencies extending beyond a reasonable range, therefore power problems associated with slow running motors and generators are avoided.

The synchronous motor A or B may then be driven at variable synchronous speeds over a limited speed range in direct relation to input from the alternating current variable frequency power supply unit. As shown in the electrical diagram of the drawing either one or the other of the synchronous motors may be powered from the variable frequency power supply unit and the remaining motor may be powered from the main line power source, or both motors may be powered directly from the main line power source, with selector switches S1 and S2 being the controlling devices for this arrangement.

In principles of operation of the differential gearing it is generally known that a bevel gear differential unit, as described, can transmit power at varying ratios of input to output speeds, and if the speeds of any two of its elements are controlled, the speed of the third element may be varied progressively from a design maximum in one direction of rotation, through zero, to a design maximum in the other direction. In theory this concept of speed control sounds simple and ideal for speed requirements over an infinite, zero reversing speed range. However, in actual practice it has been found by many that powered differential motion, as such, is not so simple to control.

In the present system the output shaft 2 will rotate at a speed which is the function of the difference in speed of the two synchronous motors. More specifically the system output shaft will rotate at a speed which is one-half the algerbraic sum of the speeds of the two differential end input gears 8 and 9.

To further the description of the operating principles of the present system, a practical working example of a typical system is given as follows.

The system will be initially powered from an alternating current main line power source at a fixed frequency of 60 cycles per second. The main line power will then be transmitted through the variable frequency power supply unit, which may be easily constructed to produce alternating current at variable frequencies from 50 to 70 cycles per second. The synchronous motors will be of two pole construction and will then have a base speed of 3600 revolutions per minute at 60 cycles per second alternating current input. As shown either motor A or B can be powered from the variable frequency power supply through electrical selector switch S1 and S2 respectively. If motor A is powered from the variable frequency power supply, this motor may be then driven at variable speeds from 3000 to 4200 revolutions per minute in direct relation to input power from the variable frequency power supply unit. Motor B will then be connected to the main line power source at 60 cycles per second, through selector switch S2, and will then rotate at a constant synchronous speed of 3600 revolutions per minutes. Motor B is then running at a speed which is midway between the high and low operating speeds of motor A. With this arrangement, it can be readily seen if motor A is adjusted to synchronise with motor B at 60 cycles per second (3600 r.p.m.) the system output shaft will be at zero speed. As motor A is increased in speed over motor B the system output shaft will commence to rotate at a speed which is one half the difference of the speeds of the two motors. If motor A is adjusted to run at speeds slower than motor B, the system output shaft will reverse its direction of rotation, the same input to output speed relationship will exist only in a reverse state of operation. Reversing of the system output shaft will then take place instantly when driven beyond 60 c.p.s. (3600 r.p.m.) in either direction, and reversing is accomplished without interruption of input or output power. The overall system speed range from zero to maximum design limits in both directions of rotation is then accomplished by driving motor A from the variable frequency power supply over its limited speed range from 3000 to 4200 r.p.m. The system overall output speed range will then be from zero to 300 r.p.m. in both directions or rotation.

To assure that the system output shaft will be positively locked in a stationary position at zero speed, motor A may be switched over to the main line power source along with motor B. In so doing both motors will be positively synchronized at 3600 revolutions per minute. And the system output shaft will be locked at absolute zero.

When input to the differential unit from motor A is faster than from motor B it may be taken as a positive value, the slower input from motor B is then regarded as a negative value. If input from motor A is slower than motor B the opposite condition will exist. The motor running at the faster speed is then the positive driver of the system output shaft, the slower motor providing the negative input is of course the system differential speed subtractor, but may also be regarded as a negative load power braking unit; this being a very important part of the present invention, as will be explained.

In further operation of the system, it can also be realized that the system output shaft can be driven over its entire speed range, in both directions, with the variable frequency power supply unit limited to operation within a variable output range from 50 to 60 cycles per second. In a given example—if the variable frequency power supply is limited between 50 and 60 c.p.s., then motor A or B can be driven variable speeds between 3000 and 3600 r.p.m., through selector switch S1 or S2. If the second motor is connected to the main line power source at 60 c.p.s. and running at a constant synchronous speed of 3600 r.p.m. reversing of the system output shaft can then be accomplished by simultaneous switching motors between the variable frequency power supply and the main line power source. It should be noted that the direction of rotation of the system output shaft will always be the same as the direction of rotation of the synchronous motor running at the fastest speed, which again is the positive driver of the system output shaft. The full reversing speed range of the system output shaft is then accomplished by driving one or the other of the synchronous motors, at variable speeds below the fixed constant speed of the remaining motor, using the electrical selector switches S1 and S2 to control direction of rotation. The system output speed range will be the same as previously given, only reversing will be accomplished by switching from one motor to the other for a given direction of rotation. Under these operating conditions the constant speed motor running at 3600 r.p.m. will always be the positive driver of the system output shaft. The synchronous motor driven at variable speeds below 3600 r.p.m. is then the system differential speed subtractor, and may also be looked upon as a load braking unit for control of circulating negative load power.

The speeds and alternating current frequency relationships given are by way of example only and do not necessarily limit the maximum output speed range of the system.

It is known that power transmission systems of the mechanical differential gear type have been adapted to certain variable speed drive requirements. Basically, all systems consist of three rotating differential elements; the speed of any one element being the function of the speeds of the other two. In theory this general arrangement appears on the surface to be ideal for variable speed, zero reversing, drive requirements. However, there is a major design problem area common to all systems, which is not readily apparent and may be easily overlooked due to rather complex kinematic arrangements of most differential systems: velocity, force, torque and energy relationships between the various elements of the system are often difficult to visualize. Basically the problem centers around a circulating negative load power characteristic which in closed loop systems, can produce torques of destructive magnitude within the system. Under certain load conditions the effective power circulating within the branches of the system can build up and become considerably greater than input power, leading to excessive efficiency losses and overloading of drive elements. Low, zero and reversing output speeds are typical operating conditions which tend to produce this power unbalance in closed loop systems. The power condition referred to as negative circulating load power is prevalent, one way or another, in all differential adjustable speed drive systems of the basic type described herein. This condition is caused by the reaction of the driven load upon the negative input drive elements of the differential unit. The ultimate success of any system of this type depends largely upon the methods employed to control this differential power condition. In the present system negative circulating load power can not build up within the branches of the system and cause an unbalanced power condition. To understand this it is necessary to trace the power path and load reaction throughout the differential elements of the system. In so doing it will be found that the negative circulating load power from the driven load is free to flow back to the slow speed synchronous motor. The present system may then be considered as an open loop design. It can then be seen that the negative circulating power is acting upon the slow speed motor in a negative manner whereby it is continually attempting to overrun the natural rotation of this motor. The synchronous motors in the present system must then function as positive load braking units to control the negative circulating power created by the driven load. It is well known that alternating current synchronous motors will operate, underload, at positive constant speeds locked in absolute synchronism with input alternating current frequencies. It is also true that the synchronous motor will function the same under negative (overrunning) load conditions. In the present system this means the slow speed synchronous motor (A or B) will perform as a highly efficient rotating brake for control of negative circulating load power, in addition to its primary function as a precise differential speed subtractor.

In evaluating any adjustable speed differential drive system of the basic type described herein, it is first necessary to realize that negative circulating load power exists within all such systems. In some cases it has been found that the inventor is totally unaware of this fact and fails to take into consideration this condition of differential operation. The results, in some cases, is a totally unstable output power condition, whereby, the negative circulating load power, within the system, is permitted to overrun the slow speed negative input motor. The sought after output power is then lost in heat at the internal windings of the slow speed motor. In the present system it is again pointed out that negative circulating load power can not overrun the synchronous motors due to the operating condition of the motor rotation being locked in absolute synchronism with input alternating current frequency. The power being transmitted through the present differential drive system is then effectively and efficiently directed to the system output shaft.

In other cases of differential drives, of the so called closed loop design, the result is also apparent when studied closely, wherein, negative circulating load power is trapped within the system in such a way as to cause an unbalanced power condition and destructive overloading of drive elements. In the present system it is again pointed out that negative circulating load power cannot cause and unbalanced power condition by virtue of the present open loop design. In considering torque relationships at various elements of the system, it can be calculated that the torques transmitted at the differential side gears will always be equal and the torque transmitted at the differential spider member and system output shaft is always twice that amount. It is then necessary that the two synchronous motors be rated at equal horsepower capacity, thus providing a balanced power condition. The power delivered at the system output shaft, ignoring frictional losses, will be essentially a constant torque value at all speeds, equal to the power input from the fast speed motor.

It is recognized that various types of electrical and mechanical apparatus systems have been devised to control the basic bevel gear differential unit for the purpose of obtaining variable speed output over an infinite zero reversing speed range. Some that are operationally practicable have been tried and put to use. However, performance characteristics and cost considerations have either limited or discouraged design application and acceptance. This is evidenced by the fact there are so few of this type of drive system in use today. In the present system the two synchronous motors as combined with the bevel gear differential unit permits a simple yet highly efficient means of obtaining truly precise control of a driven load at infinitely variable speeds, over a full infinite, zero reversing, speed range.

When considering speed regulation of the system output shaft from no-load to full load capacity, it can be realized that a small amount of speed change will occur in the output shaft due to changing load conditions. This change will be directly governed by the stability of the alternating current variable frequency input to the driven synchronous motor. It is certain no matter how well the variable frequency power supply system is regulated there will always be a small amount of frequency fluctuation due to changing load conditions, which in turn will cause the speed of the driven synchronous motor to fluctuate also. In the present system the output shaft will increase in speed from no load to full load capacity, a definite advantage over conventional adjustable speed drives wherein the output shaft slows down under the applied load. Speed increase of the system output shaft under changing load conditions will exist when the variable frequency power supply unit is being used to control negative input power to the differential unit, and the constant fixed frequency power is used to provide positive drive power to the differential. Under these conditions, when the system output shaft is loaded from no-load to full load capacity, the synchronous motor being driven by the variable frequency power supply unit will slow down causing greater difference in speed between the two synchronous motors, the system output shaft will then increase in speed due to the greater difference in speed between the two synchronous motors. In the present system this means that the output shaft may be operated at infinitesimal speeds approaching zero without losing control of output shaft motion at zero under changing load conditions. The speed of the synchronous motor being driven by the fixed frequency power source is of course constant at all times and will remain unaffected by changing load conditions. Regulation of the system output shaft at zero speed may be definitely set at absolute zero, since both motors may be switched to the main line power source to operate at exact synchronous speeds.

In review of the operational controls of the system, speed adjustment of the output shaft is accomplished by adjusting potentiometer P1. Reversing of the output shaft may also be accomplished by this device when the variable speed synchronous motor is driven above and below the base speed of the constant speed synchronous motor. In the selector switches of the system it can be seen that the system output shaft can be instantly reversed in direction of rotation, from any running speed, by switching the two synchronous motors between the variable frequency power supply and the main line power source. In addition the selector switches may be used to switch the system output shaft instantly to positive zero speed, by switching the variable speed synchronous motor over to the main line power source.

In addition to manual control, the present drive system offers some important advantages wherever automatic machine operation is required. Whereby the speed control potentiometer and electrical selector switches may be controlled by well known automatic control devices, such as timing mechanisms, relays, stepping switches, limit switches, position sensors and the like, thus providing a simple means of obtaining precision automatically controlled machine motions such as reciprocating motion, rotary or linear positioning actuation, feeding, transferring, indexing and the like. It is obvious that the present drive system can be extended into highly accurate automatic machine motion control of all types with controlled acceleration and deacceleration and positive precise holding power at zero speed.

The potential applications for this drive system are certainly very broad in scope. In addition to automatically controlled machine motion of all types, other excellent applications will include manual remotely controlled machines and materials handling equipment such as remotely controlled crane hoists, manipulators, conveyors, atomic control rods and the like, wherever critically accurate control of the load being handled is required. In addition, other applications will include a number of different industrial processing operations which involve the continuous controlled movements of materials, or the mixing of food chemicals, liquids, etc., and other similar production jobs where speeds must be varied over a wide range going to zero and in reverse, and where close control of torque and speed over the full speed range is important.

The overall versatility of the present drive system far exceeds that of presently known electrical drive apparatus of all types. The present invention provides new and unexpected results from a powered rotating drive shaft.

Having described my invention, I claim:

An electrically powered and controlled adjustable speed reversing drive apparatus system with synchronous rotating output shaft infinitely variable in angular velocity of rotation from zero to maximum design speed limits in clockwise or counterclockwise directions of rotation with said system output shaft providing a positive power output value at all design speeds in either direction of rotation and with said system output shaft also being positively locked in a stationary position at zero speed; said drive apparatus system consisting of a single bevel gear differential unit incorporating said system output shaft and including a spider member connected to said system output shaft as a integral part thereof, two bevel pinion gears rotably mounted one at each end of said spider member at right angles to the longitudinal axis of said system output shaft, two side bevel gears rotatably mounted on said system output shaft in mesh with said bevel pinion gears one at each side of said bevel pinion gears, two end input gears rotatably mounted on said system output shaft one at each end of said side bevel gears with said end input gears connected to said side bevel gears as integral parts thereof; a matched pair of alternating current synchronous electric motors internally arranged to rotate under power in opposite directions driving and controlling said system output shaft differentially through said differential unit, each of said synchronous motors including an output drive shaft with a single pinion drive gear solidly mounted thereon, with said pinion drive gears from said synchronous motors in mesh with said end input gears of said differential unit, said synchronous motors then to deliver positive and negative power inputs to said differential unit and system output shaft and to control negative circulating load power within said differential unit under a driven load; an alternating current constant fixed frequency electric power source driving and controlling one or the other or both of said synchronous motors at a fixed constant synchronous speed; an alternating current variable frequency power supply unit capable of producing electrical alternating current power at variable frequencies driving and controlling one or the other of said synchronous motors at variable speeds over a limited speed range extending above and below the constant speed of said other synchronous motor being powered and controlled from said fixed frequency power source; said variable frequency power supply unit consisting of an alternating current electric power generator or alternator driven at variable speeds from an adjustable speed direct current electric motor, said direct current motor being powered and controlled from an adjustable voltage power supply unit provided with a voltage adjustment potentiometer, said potentiometer then being the control device for output performance of said system output shaft; two electrical selector switches each having first and second electrical contact positions for control of input power to said synchronous motors from said alternating current constant frequency power source and from said variable frequency power supply unit, said selector switches connected one each at input power lines of one and the other of said synchronous motors with said first and second electrical contact positions of said switches connected separately to output power lines of said electrical constant frequency power source and said electrical variable frequency power supply, said selector switches then used to control said system output shaft at zero speed and also used to reverse direction of rotation of said system output shaft.

References Cited by the Examiner

UNITED STATES PATENTS

| | | | |
|---|---|---|---|
| 1,667,718 | 5/1928 | Connell | 74—675 X |
| 2,469,786 | 5/1949 | Rieber | 74—675 |
| 2,987,939 | 6/1961 | Waniger | 74—675 |

DAVID J. WILLIAMOWSKY, *Primary Examiner.*

JOHN R. BENEFIEL, *Examiner.*